(12) United States Patent
Matsui et al.

(10) Patent No.: US 7,789,345 B2
(45) Date of Patent: Sep. 7, 2010

(54) ACTUATOR CONTROL APPARATUS

(75) Inventors: Gen Matsui, Bothell, WA (US); Teruaki Tanaka, Gifu-ken (JP); Tsuyoshi Yamamoto, Gifu-ken (JP)

(73) Assignees: Nabtesco Corporation, Tokyo (JP); Nabtesco Aerospace, Inc., Redmond, WA (US)

( * ) Notice: Subject to any disclaimer, the term of this patent is extended or adjusted under 35 U.S.C. 154(b) by 1287 days.

(21) Appl. No.: 11/071,029

(22) Filed: Mar. 3, 2005

(65) Prior Publication Data

US 2006/0198737 A1 Sep. 7, 2006

(51) Int. Cl.
- B64C 3/38 (2006.01)
- B60T 7/00 (2006.01)
- F15B 3/00 (2006.01)
- G06F 19/00 (2006.01)

(52) U.S. Cl. .......... 244/99.4; 60/567; 60/579; 700/150

(58) Field of Classification Search .......... 700/2, 700/3, 150; 701/14, 33, 39; 60/567, 579; 244/99.4

See application file for complete search history.

(56) References Cited

U.S. PATENT DOCUMENTS

| | | | | |
|---|---|---|---|---|
| 4,494,208 A | * | 1/1985 | Chang | 700/290 |
| 4,807,516 A | * | 2/1989 | Takats | 91/363 A |
| 4,887,214 A | * | 12/1989 | Takats et al. | 701/3 |
| 5,012,423 A | * | 4/1991 | Osder | 701/116 |
| 5,274,554 A | * | 12/1993 | Takats et al. | 701/33 |
| 5,515,282 A | * | 5/1996 | Jackson | 701/4 |
| 5,806,805 A | * | 9/1998 | Elbert et al. | 244/195 |
| 5,806,806 A | * | 9/1998 | Boehringer et al. | 244/196 |
| 6,035,416 A | * | 3/2000 | Abdelnour et al. | 714/11 |
| 6,206,329 B1 | * | 3/2001 | Gautier et al. | 244/221 |
| 6,446,911 B1 | * | 9/2002 | Yount et al. | 244/195 |
| 6,550,018 B1 | * | 4/2003 | Abonamah et al. | 714/6 |
| 6,561,463 B1 | * | 5/2003 | Yount et al. | 244/196 |
| 6,782,346 B2 | * | 8/2004 | Bond et al. | 702/183 |
| 6,799,739 B1 | * | 10/2004 | Jones | 244/10 |
| 6,860,452 B2 | * | 3/2005 | Bacon et al. | 244/194 |
| 7,017,861 B1 | * | 3/2006 | Johansson et al. | 244/194 |
| 7,047,440 B1 | * | 5/2006 | Freydel et al. | 714/11 |
| 7,175,133 B2 | * | 2/2007 | Tanaka et al. | 244/99.4 |
| 2002/0116096 A1 | * | 8/2002 | Ortega et al. | 701/4 |
| 2002/0121087 A1 | * | 9/2002 | Van Den Bossche et al. | 60/476 |
| 2002/0184410 A1 | * | 12/2002 | Apel et al. | 710/5 |
| 2003/0033553 A1 | * | 2/2003 | Liu | 714/1 |

(Continued)

FOREIGN PATENT DOCUMENTS

JP 2003-191898 7/2003

*Primary Examiner*—Albert DeCady
*Assistant Examiner*—Darrin Dunn
(74) *Attorney, Agent, or Firm*—RatnerPrestia

(57) ABSTRACT

Herein disclosed is an actuator control apparatus, comprising primary control means for producing a control signal used to control an operation of an actuator in accordance with an instruction signal indicative of an operation of the actuator, secondary control means for producing a control signal in accordance with the instruction signal; and switching means for selectively switching one of the primary control means and the secondary control means to the other, and in which the secondary control means is less in the number of functions than the primary control means, and each of components constituting the secondary control means is easier in fault verification than a component constituting the primary control means the most difficult in fault verification among all of components constituting the primary control means.

4 Claims, 3 Drawing Sheets

U.S. PATENT DOCUMENTS

| | | | |
|---|---|---|---|
| 2003/0111895 A1* | 6/2003 | Salamat et al. | 303/9.61 |
| 2003/0120399 A1* | 6/2003 | Yamamoto | 701/4 |
| 2003/0127569 A1* | 7/2003 | Bacon et al. | 244/195 |
| 2004/0075020 A1* | 4/2004 | Trikha | 244/75 R |
| 2004/0098140 A1* | 5/2004 | Hess | 700/3 |
| 2005/0116095 A1* | 6/2005 | Cline et al. | 244/75 R |
| 2006/0214066 A1* | 9/2006 | Yount et al. | 244/221 |
| 2007/0050101 A1* | 3/2007 | Sacle et al. | 701/11 |
| 2009/0308983 A1* | 12/2009 | Jones | 244/227 |

* cited by examiner

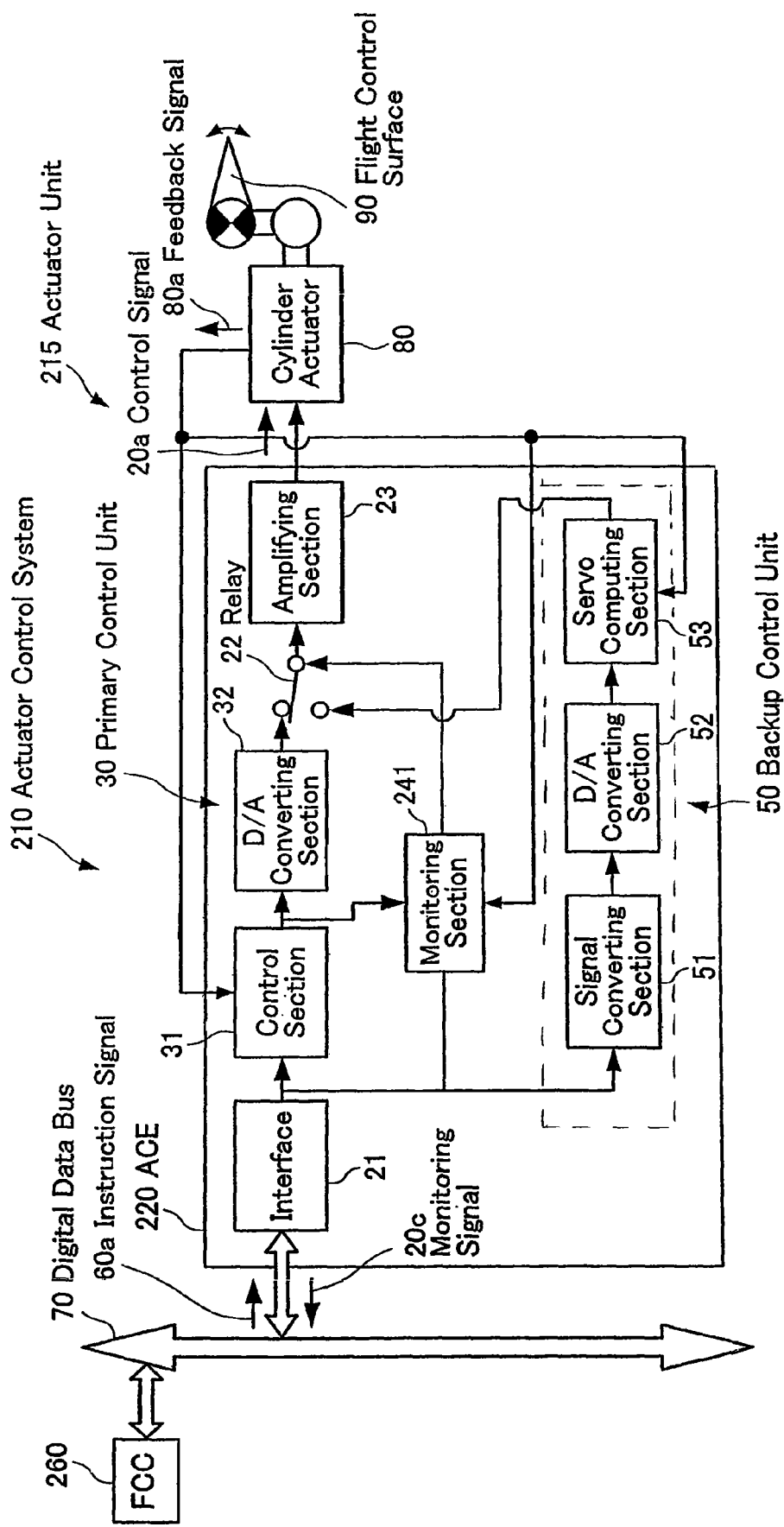

ACTUATOR CONTROL APPARATUS

BACKGROUND OF THE INVENTION

1. Field of the Invention

The present invention relates to an actuator control apparatus for controlling an operation of an actuator, and more particularly to an actuator control apparatus available for an actuator control computer forming part of an aircraft and the like, and capable of controlling an operation of an actuator even in the event that a generic failure occurs in the actuator control computer.

2. Description of the Related Art

Up until now, there have been proposed a wide variety of prior-art actuator control apparatuses. One typical example of the conventionally known actuator control apparatuses is disclosed in, for example, Japanese Patent Laid-Open Publication No. 2003-191898 (page 5, FIG. 1). The conventional actuator control apparatus therein disclosed is operative to prevent an actuator from operating in the event of a failure occurred due to the characteristics inherent in software or hardware forming part of the conventional actuator control apparatus, hereinlater simply referred to as "generic failure". Here, the conventional actuator control apparatus includes a conventional ACC (Actuator Control Computer).

The conventional actuator control apparatus, however, encounters a drawback in that the conventional actuator control apparatus cannot control the actuator in the event of the generic failure.

It is, therefore, an object of the present invention to provide an actuator control apparatus capable of controlling an actuator even in the event that a generic failure occurs.

SUMMARY OF THE INVENTION

In accordance with a first aspect of the present invention, there is provided an actuator control apparatus, comprising: primary control means for producing a control signal used to control an actuator in accordance with an instruction signal indicative of an operation of the actuator; secondary control means for producing a control signal in accordance with the instruction signal; and switching means for selectively switching one of the primary control means and the secondary control means to the other; and in which the secondary control means is less in the number of functions than the primary control means, and each of components constituting the secondary control means is easier in fault verification than a component constituting the primary control means the most difficult in fault verification among all of components constituting the primary control means.

In accordance with the above construction, the secondary control means forming part of the actuator control apparatus according to the present invention can control the actuator even in the event that a generic failure occurs in the primary control means resulting from the fact that the secondary control means is easier in fault verification than the primary control means and the secondary control means is more resistant to generic failure than the primary control means.

Further, in the actuator control apparatus according to the present invention, the primary control means may include at least one of FPGA, ASIC, and a computer having stored therein a program and operative to execute the program, and the secondary control means may be merely constituted by one of or both of an analog circuit and PLD.

In accordance with the above construction, the actuator control apparatus according to the present invention can be reduced in size than an actuator control apparatus in which each of the primary control means and the secondary control means is merely constituted by one of or both of analog circuit and PLD.

Further, the actuator control apparatus according to the present invention may further comprise slave instruction means for having an external load drive the actuator in the event that the actuator fails to operate in accordance with the instruction signal.

In accordance with the above construction, in the case that the actuator control apparatus comprises an actuator to be controlled by the actuator control apparatus itself, hereinlater referred to simply as a "controllable actuator", an actuator to be not controlled by the actuator control itself, hereinlater referred to simply as a "non-controllable actuator", and a component to be driven by the non-controllable actuator, the actuator control apparatus according to the present invention can have an external load drive the controllable actuator and thus have the component driven by the non-controllable actuator not letting the controllable actuator in the way of the non-controllable actuator in the event that the controllable actuator fails to operate in accordance with the instruction signal.

Further, in the actuator control apparatus according to the present invention, each of components constituting the secondary control means may be easier in fault verification than a component constituting the slave instruction means the most difficult in fault verification among all of components constituting the slave instruction means.

In accordance with the above construction, the secondary control means forming part of the actuator control apparatus according to the present invention can control the actuator even in the event that a generic failure occurs in the slave instruction means resulting from the fact that the secondary control means is easier in fault verification than the slave instruction means and the secondary control means is more resistant to generic failure than the slave instruction means.

Further, in the actuator control apparatus according to the present invention, each of the primary control means and the slave instruction means may include at least one of FPGA, ASIC, and a computer having stored therein a program and operative to execute the program, and the secondary control means may be merely constituted by one of or both of analog circuit and PLD.

In accordance with the above construction, the actuator control apparatus according to the present invention can be reduced in size than an actuator control apparatus in which each of the primary control means and the slave instruction means is merely constituted by one of or both of analog circuit and PLD.

Further, the actuator control apparatus according to the present invention may further comprise feedback signal utilizing means for producing the control signal on the basis of a feedback signal supplied from the actuator, and the primary control means and the secondary control means may share the feedback signal utilizing means.

In accordance with the above construction, the actuator control apparatus according to the present invention can be reduced in size as a whole as compared with an actuator control apparatus in which the primary control means and the secondary control means comprise respective feedback signal utilizing means separated from each other.

Further, the actuator control apparatus according to the present invention may further comprise operation control means for controlling the switching means to have the switching means switch the primary control means to the secondary control means in the event that the actuator fails to operate in accordance with the instruction signal under control of the primary control means.

In accordance with the above construction, the actuator control apparatus according to the present invention can automatically switch the primary control means to the secondary control means.

In accordance with a second aspect of the present invention, there is provided an actuator unit, comprising: an actuator; and an actuator control apparatus integrally formed with the actuator, and operative to control the actuator, and in which the actuator control apparatus includes: primary control means for producing a control signal used to control an actuator in accordance with an instruction signal indicative of an operation of the actuator; secondary control means for producing a control signal in accordance with the instruction signal; and switching means for selectively switching one of the primary control means and the secondary control means to the other; and in which the secondary control means is less in the number of functions than the primary control means, and each of components constituting the secondary control means is easier in fault verification than a component constituting the primary control means the most difficult in fault verification among all of components constituting the primary control means.

In accordance with the above construction, in the actuator unit according to the present invention, the secondary control means forming part of the actuator control apparatus according to the present invention can control the actuator even in the event that a generic failure occurs in the primary control means resulting from the fact that the secondary control means is easier in fault verification than the primary control means and the secondary control means is more resistant to generic failure than the primary control means. Further, the actuator unit according to the present invention thus constructed as previously mentioned can reduce the number of wires required between the actuator and control component controlling an operation of the actuator control apparatus as compared with the number of wires required between the actuator and control component controlling an operation of the actuator control apparatus in which the actuator control apparatus and the actuator are formed separately from each other.

In accordance with a third aspect of the present invention, there is provided an actuator control system, comprising: a plurality of actuator control apparatuses for controlling respective actuators; and main control apparatus for controlling said actuator control apparatuses, and in which each of said actuator control apparatuses includes: primary control means for producing a control signal used to control an actuator in accordance with an instruction signal indicative of an operation of said actuator; secondary control means for producing a control signal in accordance with said instruction signal; and switching means for selectively switching one of said primary control means and said secondary control means to the other; and in which said secondary control means is less in the number of functions than said primary control means, and each of components constituting said secondary control means is easier in fault verification than a component constituting said primary control means the most difficult in fault verification among all of components constituting said primary control means, and said main control apparatus is operative to have said switching means of at least one of said actuator control apparatuses switch said primary control means to said secondary control means in the event that a predetermined number is exceeded by the number of actuators failing to operate in accordance with said instruction signal under control of said primary control means.

BRIEF DESCRIPTION OF THE DRAWINGS

The present invention and many of the advantages thereof will be better understood from the following detailed description when considered in connection with the accompanying drawings, wherein:

FIG. 3 is a block diagram of a third preferred embodiment of the actuator control system according to the present invention.

DESCRIPTION OF THE PREFERRED EMBODIMENTS

Preferred embodiments of the present invention will be described hereinafter with reference to the drawings.

First Preferred Embodiment

A construction of the first preferred embodiment of the actuator control system will be described first with reference to FIG. 1 of the drawings.

Figure 1:
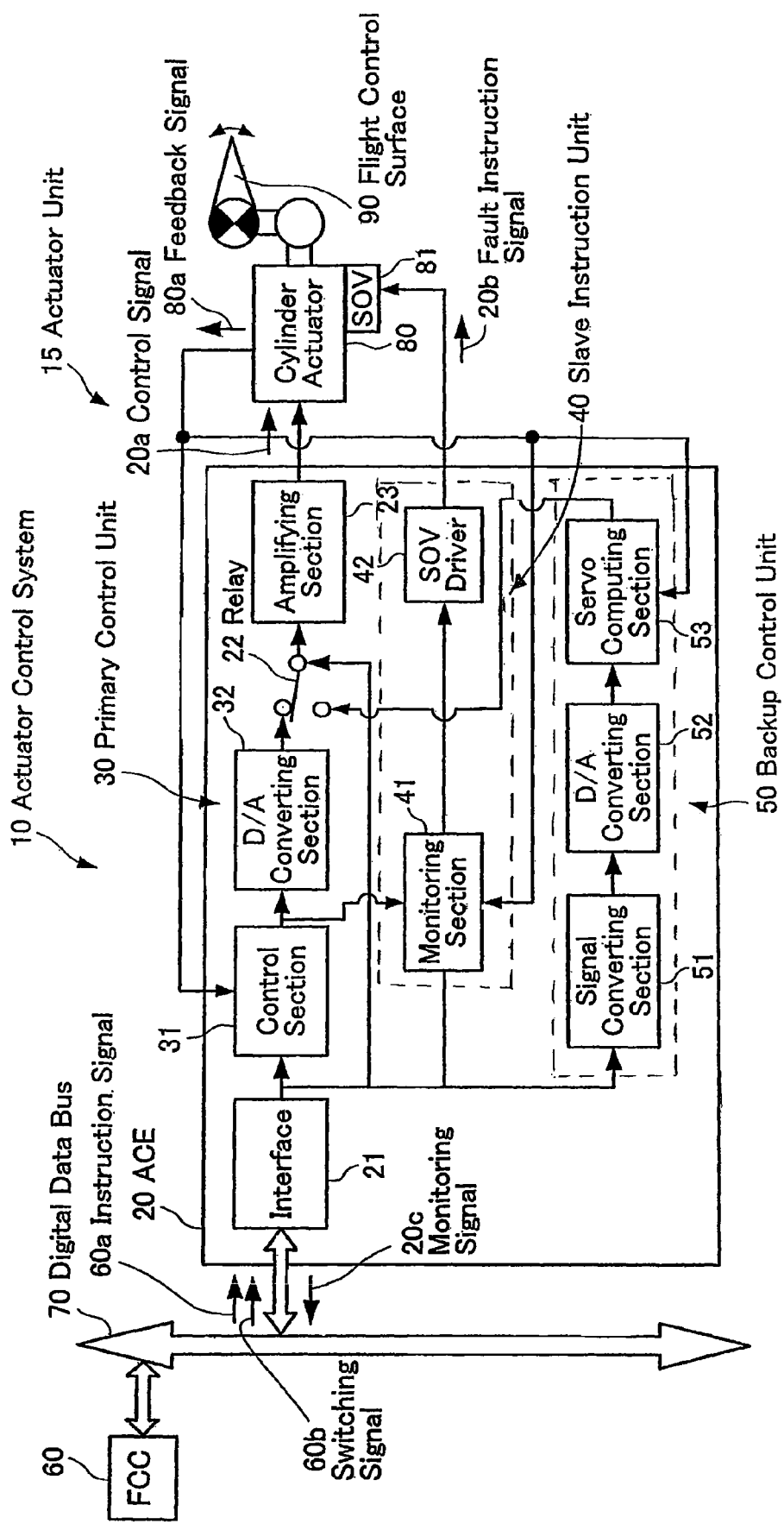
FIG. 1 is a block diagram of a first preferred embodiment of an actuator control system according to the present invention.

The actuator control system 10 exemplified and shown in FIG. 1 is mounted on an aircraft, not shown, and adapted to control an operation of an actuator constituted by a cylinder actuator actuating a flight control surface 90. As will be clearly seen from FIG. 1, there is shown only one cylinder actuator 80 for the purpose of simplifying the description and assisting in understanding about the whole operation of the actuator control system 10. In reality, the flight control surface 90 is controlled by a plurality of cylinder actuators each the same in construction as the cylinder actuator 80.

The actuator control system 10 shown in FIG. 1 comprises an actuator control apparatus constituted by an ACE (Actuator Control Electronics) 20 for producing a control signal 20a to be outputted to the cylinder actuator 80. The control signal 20a is used to control the cylinder actuator 80. As will be clearly seen from FIG. 1, there are shown only one cylinder actuator 80 and one ACE 20 for controlling the operation of the cylinder actuator 80 actuating the flight control surface 90 for the purpose of simplifying the description and assisting in understanding about the whole operation of the actuator control system 10. In reality, the actuator control system 10 comprises a plurality of cylinder actuators actuating the flight control surface 90 and a plurality of ACEs for respectively controlling the operations of cylinder actuators. Each of the cylinder actuators is the same in construction as the cylinder actuator 80 and each of the ACEs is the same in construction as the ACE 20.

The actuator control system 10 further comprises main control apparatus constituted by an FCC (Flight Control Computer) 60 for controlling the ACEs including the ACE 20, and a digital data bus 70 for electrically connecting the ACEs with the FCC 60. The FCC 60 is adapted to transmit serial data constituted by various types of signals including an instruction signal 60a indicative of an operation of the cylinder actuator 80 through the digital data bus 70 to each of the ACEs.

The ACE 20 is integrally formed with the cylinder actuator 80. The ACE 20 and the cylinder actuator 80 collectively constitute an actuator unit 15. Likewise, the ACEs other than the ACE 20 are integrally formed with the respective cylinder actuators. A pair of each of the ACEs and each of the respective cylinder actuators collectively constitutes an actuator unit. Each of the other actuator units constituted by the pairs of the other ACEs and respective cylinder actuators is the same in construction as the actuator unit 15, and thus will not be described in detail to avoid tedious repetition.

The ACE 20 comprises an interface 21 for having a signal transmitted to and a signal received from the FCC 60, primary control means constituted by a primary control unit 30 for normally producing a control signal 20a used to control an cylinder actuator 80 in accordance with an instruction signal 60a indicative of an operation of the cylinder actuator 80, slave instruction means constituted by a slave instruction unit 40 for having an external load drive the cylinder actuator 80 in the event that the cylinder actuator 80 fails to operate in accordance with the instruction signal 60a by the reason, for example, that the primary control unit 30 is abnormally operating, secondary control means constituted by a backup control unit 50 for producing a control signal 20a in accordance with the instruction signal 60a in place of the primary control unit 30, and switching means constituted by a relay unit 22 for selectively switching one of the primary control unit 30 and the backup control unit 50 to the other.

The primary control unit 30 comprises a control section 31 for producing a raw control signal, a DA (digital to analog) converting section 32 for converting the raw control signal produced by the control section 31 from digital signal format to analog signal format, and an amplifying section 23 for amplifying the raw control signal of an analog signal format converted by the DA converting section 32 to output a control signal 20a therethrough. s The slave instruction unit 40 comprises a monitoring section 41 for monitoring various faults, and an SOV (Solenoid Valve) driver 42 for outputting a slave instruction signal 20b to drive an SOV 81 forming part of the cylinder actuator 80.

The backup control unit 50 comprises a signal converting section 51 for converting the instruction signal 60a outputted from the interface 21 from serial data format to parallel data format, a DA (digital to analog) converting section 52 for converting the instruction signal 60a of parallel data format converted by the signal converting section 51 from digital signal format to analog signal format, a servo computing section 53 for computing a raw control signal on the basis of a feedback signal 80a supplied from the cylinder actuator 80 and the instruction signal 60a outputted from the DA converting section 52, and the amplifying section 23.

The relay unit 22 is designed to selectively assume one of two operation modes including a primary mode having the DA converting section 32 output the raw control signal to the amplifying section 23 and a backup mode having the servo computing section 53 output the raw control signal to the amplifying section 23 in accordance with a switching signal 60b supplied from the FCC 60.

The control section 31 is designed to produce a raw control signal on the basis of the instruction signal 60a supplied from the FCC 60, the feedback signal 80a supplied from the cylinder actuator 80, and sensor signals received from various types of sensors, not shown while, on the other hand, the servo computing section 53 is operative to compute a raw control signal on the basis of the feedback signal 80a supplied from the cylinder actuator 80 and the instruction signal 60a outputted from the DA converting section 52. This leads to the fact that the primary control unit 30 is greater in the number of functions than the backup control unit 50.

The monitoring section 41 serves to monitor various faults as described hereinearlier. The monitoring section 41 is adapted to, for example, calculate a raw control signal on the basis of the instruction signal 60a supplied from the FCC 60, the feedback signal 80a supplied from the cylinder actuator 80, and sensor signals received from various types of sensors in the same manner as the control section 31, and compare the raw control signal thus calculated with the raw control signal computed by the control section 31 to judge whether or not a failure occurs in the computing operation carried out by the control section 31 on the basis of the result of the comparison. Further, the monitoring section 41 is operative to monitor whether or not a failure occurs in the cylinder actuator 80 itself in the case that the cylinder actuator 80 is designed to supply the feedback signal 80a constituted by a differential signal. Still further, the monitoring section 41 is operative to monitor whether or not a failure occurs in the signals transmitted from the FCC 60 by carrying out a parity check on each of the signals transmitted from the FCC 60. This leads to the fact that the slave instruction unit 40 is greater in the number of functions than the backup control unit 50.

Further, the monitoring section 41 is adapted to transmit a monitoring signal 20c indicative of the result of the monitoring operation carried out by the monitoring section 41 to the FCC 60 through the interface 21.

Further, the monitoring section 41 is adapted to have the SOV driver 42 transmit a slave instruction signal 20b to drive the SOV 81 to have the cylinder actuator 80 driven in accordance with an external load exerted by the flight control surface 90 in the event that the monitoring section 41 detects a fault.

Here, the control section 31 is constituted by at least one of FPGA (Field Programmable Gate Array), ASIC (Application Specific Integrated Circuit), and computer having stored therein a program and operative to execute the program to implement functions, hereinlater referred to simply as "computer". The DA converting section 32 and the amplifying section 23 are constituted by respective analog circuits. This leads to the fact that the primary control unit 30 includes at least one of FPGA, ASIC, and computer.

The monitoring section 41 is constituted by at least one of FPGA, ASIC, and computer. The SOV driver 42 is constituted by an analog circuit. This leads to the fact that the slave instruction unit 40 includes at least one of FPGA, ASIC, and computer.

The signal converting section 51 is constituted by at least one of analog circuit and PLD (Programmable Logic Device). Each of the DA converting section 52 and the amplifying section 23 is constituted by an analog circuit. The amplifying section 23 is constituted by an analog circuit as described hereinearlier. This leads to the fact that the backup control unit 50 is merely constituted by one of or both of analog circuit and PLD.

In the case that each of the control section 31 and the monitoring section 41 is implemented by a computer, the fact that each of the control section 31 and the monitoring section 41 has many functions makes it extremely difficult to verify internal failures in and verify inputs into and outputs from each of the control section 31 and the monitoring section 41. In the case that each of the control section 31 and the monitoring section 41 is constituted by FPGA or ASIC, the fact that each of the control section 31 and the monitoring section 41 has many functions leads to the fact that the number of gates is enormously increased to, for example, more than 50,000. Accordingly, the fact that that each of the control section 31 and the monitoring section 41 has many functions makes it extremely difficult to verify internal failures in and verify inputs into and outputs from each of the control section 31 and the monitoring section 41. Contrary to the above, it is, in general, easy to verify internal failures in and verify inputs into and outputs from an analog circuit. Also, it is easy to verify internal failures in and verify inputs into and outputs from PLD resulting from the fact that PLD has only few thousands of gates. The fact that the backup control unit 50 is constituted merely by one of or both of analog circuit and PLD leads to the fact that each of components constituting the backup control unit 50 is easier in fault verification than the control section 31, viz., a component constituting the primary control unit 30 which is the most difficult in fault verification among all of components constituting the primary control unit 30. Likewise, the fact that the backup control unit 50 is constituted merely by one of or both of analog circuit and PLD leads to the fact that each of components constituting the backup control unit 50 is easier in fault verification than the monitoring section 41, viz., a component constituting the slave instruction unit 40 which is the most difficult in fault verification among all of components constituting the slave instruction unit 40.

The FCC 60 is designed to transmit a switching signal 60b to all of the ACEs to have the respective relay units switch the primary control units to the backup control units in the event that the number of fault cylinder actuators increases to above a predetermined number. This means that the FCC 60 is designed to have the relay units assume the backup modes having the respective servo computing sections output the raw control signals to the respective amplifying sections in response to the switching signal 60b supplied from the FCC 60. The word "fault cylinder actuator" appearing herein is intended to means a cylinder actuator which fails to operate in accordance with the instruction signal.

Then, the operation of the actuator control system 10 will be described hereinlater.

The following description will be directed to the case that the number of the fault cylinder actuators is not above the predetermined number.

The monitoring section 41 is operated to monitor various faults as described hereinearlier, and transmit a monitoring signal 20c to the FCC 60 through the interface 21. The FCC 60 is operated to judge whether or not the number of the fault cylinder actuators is above the predetermined number on the basis of the monitoring signals 20c respectively received from all of the ACEs. When it is judged by the FCC 60 that the number of the fault cylinder actuators is not above the predetermined number, the FCC 60 is operated to transmit an instruction signal 60a to all of the ACEs. The considerations that should be entertained as causes of a fault cylinder actuator include fault of a slave instruction unit and fault of a cylinder actuator itself as well as fault of a primary control unit. The fault of an instruction unit may cause the ACE to fail to transmit the monitoring signal 20c to the FCC 60. However, the FCC 60 is operative to judge a cylinder actuator as being the fault cylinder actuator when the ACE controlling operations of the cylinder actuator fails to transmit the monitoring signal 20c to the FCC 60.

The instruction signal 60a supplied by the FCC 60 is transmitted to the interface 21 forming part of the ACE 20 through the digital data bus 70. The control section 31, the monitoring section 41, and the signal converting section 51 are then operated to receive the instruction signal 60a through the interface 21.

The control section 31, the monitoring section 41, and the servo computing section 53 are operated to receive a feedback signal 80a from the cylinder actuator 80.

The control section 31 and the monitoring section 41 are operated to receive sensor signals from various types of sensors.

The control section 31 is operated to produce a raw control signal on the basis of the instruction signal 60a supplied from the FCC 60, the feedback signal 80a supplied from the cylinder actuator 80, and the sensor signals received from various types of sensors. The DA converting section 32 is operated to convert the raw control signal produced by the control section 31 from digital signal format to analog signal format.

The monitoring section 41 is operated to monitor various faults on the basis of the instruction signal 60a received through the interface 21, the feedback signal 80a supplied from the cylinder actuator 80, and the sensor signals received from various types of sensors, and transmit the monitoring signal 20c to the FCC 60 through the interface 21.

The signal converting section 51 is operated to convert the instruction signal 60a received through the interface 21 from serial data format to parallel data format. The DA converting section 52 is operated to convert the instruction signal 60a of parallel data format from digital signal format to analog signal format. The servo computing section 53 is operated to compute a raw control signal on the basis of the instruction signal 60a of analog signal format converted by the DA converting section 52 and the feedback signal 80a supplied from the cylinder actuator 80.

The relay unit 22 is operated to assume the primary mode having the DA converting section 32 output the raw control signal to the amplifying section 23 under the condition that the relay unit 22 receives no switching signal 60b. The amplifying section 23 is operated to amplify the raw control signal to output a control signal 20a to the cylinder actuator 80.

When the monitoring section 41 detects a fault, the monitoring section 41 is operated to have the SOV driver 42 transmit a slave instruction signal 20b to drive the SOV 81. The SOV 81 forming part of the cylinder actuator 80 is then operated to have the cylinder actuator 80 driven in accordance with an external load exerted by the flight control surface 90 in response to the slave instruction signal 20b supplied from the SOV driver 42 forming part of the ACE 20.

When, on the other hand, the monitoring section 41 does not detect any fault, the cylinder actuator 80 is operated to actuate the flight control surface 90 in accordance with the control signal 20a produced by the ACE 20.

While it has been described in the above about the operation of the actuator unit 15, each of the operations of the actuator units other than the actuator unit 15 is almost the same as that of the actuator unit 15, and thus will not be described in detail hereinafter.

The following description will be directed to the case that the number of the fault cylinder actuators is above the predetermined number.

The monitoring section 41 is operated to monitor various faults as described hereinearlier, and transmit a monitoring signal 20c to the FCC 60 through the interface 21. The FCC 60 is operated to judge whether or not the number of the fault cylinder actuators is above the predetermined number on the basis of the monitoring signals 20c respectively received from all of the ACEs. When it is judged by the FCC 60 that the number of the fault cylinder actuators is above the predetermined number, the FCC 60 is operated to transmit an instruction signal 60a and a switching signal 60b to all of the ACEs.

The operation of each of the interface 21, the control section 31, the DA converting section 32, the signal converting section 51, the DA converting section 52, the servo computing section 53 is the same as that of each of the interface 21, the control section 31, the DA converting section 32, the signal converting section 51, the DA converting section 52, the servo computing section 53 in the case that the number of the fault cylinder actuators is not above the predetermined number, and thus will not be described in detail hereinafter.

The switching signal 60b supplied by the FCC 60 is transmitted to the interface 21 forming part of the ACE 20 through the digital data bus 70. The relay unit 22 and the monitoring section 41 are then operated to receive the switching signal 60b through the interface 21.

The relay unit 22 is operated to switch the primary control unit 30 to the backup control unit 50 in response to the switching signal 60b. This means that the relay unit 22 is operated to assume the backup mode having the servo computing section 53 output the raw control signal to the amplifying section 23 in response to the switching signal 60b supplied from the FCC 60. The amplifying section 23 is operated to amplify the raw control signal to output a control signal 20a to the cylinder actuator 80. The cylinder actuator 80 is thus operated to actuate the flight control surface 90 in accordance with the control signal 20a supplied by the backup control unit 50 forming part of the ACE 20.

After receiving the switching signal 60b, the monitoring section 41 is continuously operated to monitor various faults on the basis of the instruction signal 60a received through the interface 21, the feedback signal 80a supplied from the cylinder actuator 80, and the sensor signals received from various types of sensors, and transmit the monitoring signal 20c to the FCC 60 through the interface 21. Although it has been described in the above that the monitoring section 41 is operative to have the SOV driver 42 transmit the slave instruction signal 20b when the monitoring section 41 detects a fault in the case that the number of the fault cylinder actuators is not above the predetermined number, the monitoring section 41 is not operative to have the SOV driver 42 transmit the slave instruction signal 20b even when the monitoring section 41 detects a fault in the case that the number of the fault cylinder actuators is above the predetermined number.

While it has been described in the above about the operation of the actuator unit 15, each of the operations of the actuator units other than the actuator unit 15 is almost the same as that of the actuator unit 15, and thus will not be described in detail hereinafter.

This leads to the fact that the flight control surface 90 is actuated by the cylinder actuator operated in accordance with the instruction signal 60a.

From the foregoing description, it is to be understood that in the actuator control system 10, the actuator unit 15, and the ACE 26 thus constructed as previously mentioned, the backup control unit 50 is easier in fault verification and more resistant to generic failure than each of the primary control unit 30 and the slave instruction unit 40. This leads to the fact that the backup control unit 50 can control an operation of the cylinder actuator 80 even in the event that a generic failure occurs in either of the primary control unit 30 and the slave instruction unit 40.

Further, the actuator control system 10 can automatically switch the primary control unit 30 to the backup control unit 50 in the event that the number of the fault cylinder actuators is above the predetermined number resulting from the fact that the FCC is operative to transmit the switching signal 60b when the number of the fault cylinder actuators exceeds the predetermined number.

Still further, in the actuator unit 15, the ACE 20 and the cylinder actuator 80 are integrally formed with each other. This leads to the fact that the number of wires required between the ACE 20 and the cylinder actuator 80 forming part of the actuator unit 15 is reduced as compared with the number of wires required between an ACE and a cylinder actuator forming an actuator unit in which the ACE and the cylinder actuator are formed separately from each other. Though it has been described in the above that the ACE 20 and the cylinder actuator 80 forming part of the actuator unit 15 are integrally formed with each other, it is needless to mention that the ACE 20 and the cylinder actuator 80 forming part of the actuator unit according to the present invention may be formed separately from each other.

In the ACE 20, each of the primary control unit 30 and the slave instruction unit 40 includes at least one of FPGA, ASIC, and computer. This leads to the fact that the ACE 20 as a whole is smaller in size than an ACE in which each of the primary control unit 30 and the slave instruction unit 40 is merely constituted by one of analog circuit and PLD.

Yet further, the ACE 20 is operative to have an external load drive the cylinder actuator 80 in the event that the cylinder actuator 80 fails to operate in accordance with the instruction signal 60a. This leads to the fact that the ACE 20 can prevent the cylinder actuator 80 from hindering the other cylinder actuator from actuating the flight control surface 90 in the event that the cylinder actuator 80 fails to operate in accordance with the instruction signal 60a.

Preferably, the control section 31 and the monitoring section 41 should be manufactured by respective manufacturers different from each other. The ACE 20 thus constructed is reduced in the occurrence of generic failure common to the control section 31 and the monitoring section 41 as compared with the ACE 20 in which the control section 31 and the monitoring section 41 are manufactures by the same manufacturer.

While it has been described in the above about the actuator control system 10 that all of the ACEs have respective backup control units control the operations of the cylinder actuators in the case that the number of the fault cylinder actuators is above the predetermined number, it is needless to mention that in the actuator control system 10 according to the present invention only particular one or more ACEs may have respective one or more backup control units control the operations of the cylinder actuators in the case that the number of the fault cylinder actuators is above the predetermined number.

Second Preferred Embodiment

A construction of the second preferred embodiment of the actuator control system will be described first.

The constitutional elements of the second embodiment of the actuator control system entirely the same as those of the first embodiment of the actuator control system will not be described in detail but bear the same reference numerals and legends as those of the first embodiment of the actuator control system shown in FIG. 1 to avoid tedious repetition.

Figure 2:
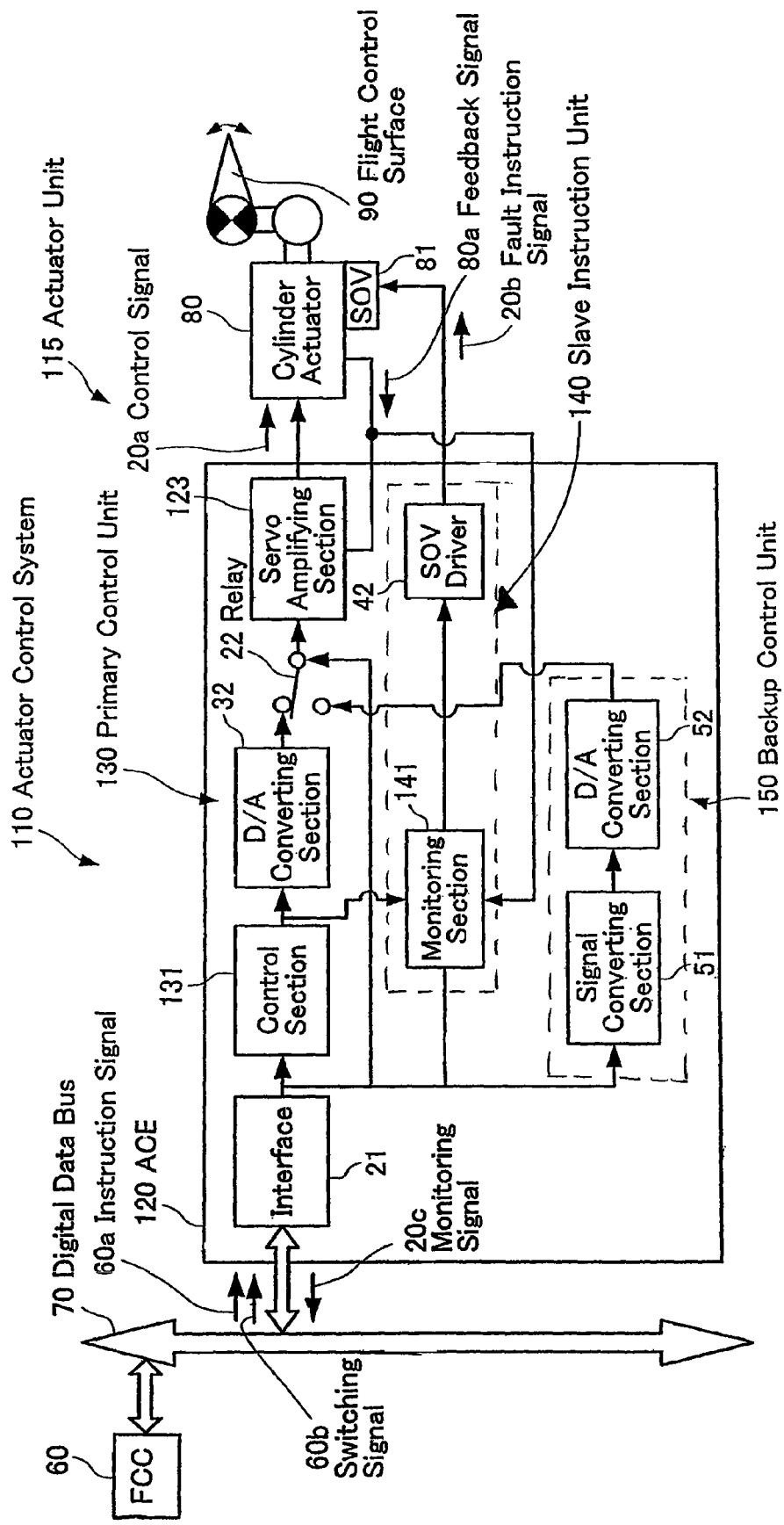
FIG. 2 is a block diagram of a second preferred embodiment of the actuator control system according to the present invention.

As best shown in FIG. 2, the construction of the present embodiment of the actuator control system 110 is almost the same as that of the first embodiment of the actuator control system 10 except for the fact that the actuator control system 110 comprises an actuator control apparatus constituted by an ACE 120 in place of the ACE 20 (see FIG. 1).

The construction of the ACE 120 is the same as the construction of the ACE 20 except for the fact that the ACE 120 comprises primary control means constituted by an primary control unit 130 in place of the primary control unit 30 (see FIG. 1), slave instruction means constituted by a slave instruction unit 140 in place of the slave instruction unit 40 (see FIG. 1), and secondary control means constituted by a backup control unit 150 in place of the backup control unit 150 (see FIG. 1). The actuator control system 110 is designed to control a cylinder actuator actuating the flight control surface 90. As will be clearly seen from FIG. 2, there are shown only one cylinder actuator 80 and one ACE 120 for controlling the operation of the cylinder actuator 80 actuating the flight control surface 90 for the purpose of simplifying the description and assisting in understanding about the whole operation of the actuator control system 110. In reality, the actuator control system 110 comprises a plurality of cylinder actuators actuating the flight control surface 90 and a plurality of ACEs for respectively controlling the operations of cylinder actuators. Each of the cylinder actuators is the same in construction as the cylinder actuator 80 and each of the ACEs is the same in construction as the ACE 120.

The ACE 120 is integrally formed with the cylinder actuator 80. The ACE 120 and the cylinder actuator 80 collectively constitute an actuator unit 115. Likewise, the ACEs other than the ACE 120 are respectively integrally formed with the respective cylinder actuators. A pair of each of the ACEs and each of the respective cylinder actuators collectively constitutes an actuator unit. Each of the other actuator units constituted by the pairs of the other ACEs and respective cylinder actuators is the same in construction as the actuator unit 115, and thus will not be described in detail to avoid tedious repetition.

The construction of the primary control unit 130 is the same as the construction of the primary control unit 30 except for the fact that the primary control unit 130 comprises a control section 131 in place of the control section 31 (see FIG. 1) and a servo amplifying section 123 in place of the amplifying section 23 (see FIG. 1).

The construction of the control section 131 is the same as that of the control section 31 except for the fact that the control section 131 is designed to produce a raw control signal on the basis of the instruction signal 60a supplied from the FCC 60 and the sensor signals received from various types of sensors but independently from the feedback signal 80a supplied from the cylinder actuator 80 while, on the other hand, the backup control unit 150, which will be described later, is operative to compute a raw control signal on the basis of the instruction signal 60a outputted from the DA converting section 52 but independently from the feedback signal 80a supplied from the cylinder actuator 80. This leads to the fact that the primary control unit 130 is greater in the number of functions than the backup control unit 150.

The construction of the servo amplifying section 123 is the same as that of the amplifying section 23 except for the fact that the servo amplifying section 123 is designed to produce a control signal 20a on the basis of the raw control signal outputted from the relay unit 22 and the feedback signal 80a supplied from the cylinder actuator 80. The servo amplifying section 123 constitutes feedback signal utilizing means.

The construction of the slave instruction unit 140 is the same as that of the slave instruction unit 40 except for the fact that the slave instruction unit 140 comprises a monitoring section 141 in place of the monitoring section 41 (see FIG. 1).

The construction of the monitoring section 141 is the same as that of the monitoring section 41 except for the fact that the monitoring section 141 is designed to calculate a raw control signal on the basis of the instruction signal 60a received through the interface 21 and the sensor signals received from various types of sensors in the same manner as the control section 131, and compare the raw control signal thus calculated with the raw control signal computed by the control section 131 to judge whether or not a failure occurs in the computing operation carried out by the control section 131 on the basis of the result of the comparison. This leads to the fact that the slave instruction unit 140 is greater in the number of functions than the backup control unit 150.

Here, the control section 131 is constituted by at least one of FPGA, ASIC, and computer. The DA converting section 32 is constituted by an analog circuits as described in the first embodiment. The servo amplifying section 123 is constituted by an analog circuit. This leads to the fact that the primary control unit 130 includes at least one of FPGA, ASIC, and computer.

The monitoring section 41 is constituted by at least one of FPGA, ASIC, and computer. The SOV driver 42 is constituted by an analog circuit as described in the first embodiment. This leads to the fact that the slave instruction unit 140 includes at least one of FPGA, ASIC, and computer.

The signal converting section 51 is constituted by at least one of analog circuit and PLD as described in the first embodiment. The DA converting section 52 is constituted by an analog circuit as described in the first embodiment. The servo amplifying section 123 is constituted by analog circuit as described hereinearlier. This leads to the fact that that the backup control unit 150 is merely constituted by one of or both of analog circuit and PLD.

In the case that each of the control section 131 and the monitoring section 141 is implemented by a computer, the fact that each of the control section 131 and the monitoring section 141 has many functions makes it extremely difficult to verify internal failures in and verify inputs into and outputs from each of the control section 131 and the monitoring section 141. In the case that each of the control section 131 and the monitoring section 141 is constituted by FPGA or ASIC, the fact that each of the control section 131 and the monitoring section 141 has many functions leads to the fact that the number of gates is enormously increased to, for example, more than 50,000. Accordingly, the fact that that each of the control section 131 and the monitoring section 141 has many functions makes it extremely difficult to verify internal failures in and verify inputs into and outputs from each of the control section 131 and the monitoring section 141. Contrary to the above, it is, in general, easy to verify internal failures in and verify inputs into and outputs from an analog circuit. Also, it is easy to verify internal failures in and verify inputs into and outputs from PLD resulting from the fact that PLD has only few thousands of gates. The fact that the backup control unit 150 is merely constituted by one of or both of analog circuit and PLD leads to the fact that each of components constituting the backup control unit 150 is easier in fault verification than the control section 131, viz., a component constituting the primary control unit 130 which is the most difficult in fault verification among all of components constituting the primary control unit 130. Likewise, the fact that the backup control unit 150 is merely constituted by one of or both of analog circuit and PLD leads to the fact that each of components constituting the backup control unit 150 is easier in fault verification than the monitoring section 141, viz., a component constituting the slave instruction unit 140 which is the most difficult in fault verification among all of components constituting the slave instruction unit 140.

Then, the operation of the actuator control system 110 will be described hereinlater.

The operation of the actuator control system 110 is almost the same as that of the actuator control system 10 (see FIG. 1) except for the operation appearing in the following description. Therefore, only the operation of the actuator control system 110 different from that of the actuator system 10 will be described in detail hereinlater.

The control section 131 forming part of the ACE 120 is operated to produce a raw control signal on the basis of the instruction signal 60a supplied from the FCC 60 and the sensor signals received from various types of sensors. The DA converting section 32 is operated to convert the raw control signal produced by the control section 131 from digital signal format to analog signal format.

The relay unit 22 is operated to assume the primary mode having the DA converting section 32 output the raw control signal to the servo amplifying section 123 under the condition that the relay unit 22 receives no switching signal 60b. The relay unit 22 is, on the other hand, operated to switch the primary control unit 130 to the backup control unit 150 in response to the switching signal 60b. This means that the relay unit 22 is operated to assume the backup mode having the DA converting section 52 output the raw control signal to the servo amplifying section 123 in response to the switching signal 60b supplied from the FCC 60.

The servo amplifying section 123 is operated to produce a control signal 20a on the basis of the raw control signal received from the relay unit 22 and the feedback signal 80a supplied from the cylinder actuator 80.

The monitoring section 141 is operated to calculate a raw control signal on the basis of the instruction signal 60a of serial data format received through the interface 21 and the sensor signals received from various types of sensors in the same manner as the control section 131, and compare the raw control signal thus calculated with the raw control signal computed by the control section 131 to judge whether or not a failure occurs in the computing operation carried out by the control section 131 on the basis of the result of the comparison.

While it has been described in the above about the operation of the actuator unit 115, each of the operations of the actuator units other than the actuator unit 115 is almost the same as that of the actuator unit 115, and thus will not be described in detail hereinafter.

From the foregoing description, it is to be understood that the primary control unit 130 and the backup control unit 150 forming part of the ACE 120 share the same feedback signal utilizing means constituted by the servo amplifying section 123. This leads to the fact that the ACE 120 thus constructed as previously mentioned can be reduced in size as a whole as compared with an ACE in which the primary control unit 130 and the backup control unit 150 comprise respective feedback signal utilizing means separated from each other.

Further, the ACE 120 comprises feedback signal utilizing means separately from the control section 131. This leads to the fact that the control section 131 forming part of the ACE 120 thus constructed as previously mentioned can be reduced in size as a whole as compared with the control section 31 (see FIG. 1) forming part of the first embodiment of the ACE 20 (see FIG. 1).

Third Preferred Embodiment

A construction of the third preferred embodiment of the actuator control system will be described first.

The constitutional elements of the third embodiment of the actuator control system entirely the same as those of the first embodiment of the actuator control system will not be described in detail but bear the same reference numerals and legends as those of the first embodiment of the actuator control system shown in FIG. 1 to avoid tedious repetition.

As best shown in FIG. 3, the construction of the present embodiment of the actuator control system 210 is almost the same as that of the first embodiment of the actuator control system 10 except for the fact that the actuator control system 210 comprises an actuator control apparatus constituted by an ACE 220 in place of the ACE 20 (see FIG. 1) and an FCC 260 in place of the FCC 60 (see FIG. 1).

The construction of the ACE 220 is the same as the construction of the ACE 20 except for the fact that the ACE 220 comprises operation control means constituted by a monitoring section 241 in place of the monitoring section 41 (see FIG. 1). The actuator control system 210 is designed to control a cylinder actuator actuating the flight control surface 90. As will be clearly seen from FIG. 3, there are shown only one cylinder actuator 80 and one ACE 220 for controlling the operation of the cylinder actuator 80 actuating the flight control surface 90 for the purpose of simplifying the description and assisting in understanding about the whole operation of the actuator control system 210. In reality, the actuator control system 210 comprises a plurality of cylinder actuators actuating the flight control surface 90 and a plurality of ACEs for respectively controlling the operations of cylinder actuators. Each of the cylinder actuators is the same in construction as the cylinder actuator 80 and each of the ACEs is the same in construction as the ACE 220.

The ACE 220 is integrally formed with the cylinder actuator 80. The ACE 220 and the cylinder actuator 80 collectively constitute an actuator unit 215. Likewise, the ACEs other than the ACE 220 are respectively integrally formed with the respective cylinder actuators. A pair of each of the ACEs and each of the respective cylinder actuators collectively constitutes an actuator unit. Each of the other actuator units constituted by the pairs of the other ACEs and respective cylinder actuators is the same in construction as the actuator unit 215, and thus will not be described in detail to avoid tedious repetition.

The construction of the monitoring section 241 is the same as that of the monitoring section 41 except for the fact that the monitoring section 241 is designed to control the relay unit 22 and to transmit no signal to the SOV driver 42 (see FIG. 1). This means that the monitoring section 241 is adapted to control the relay unit 22 to have the relay unit 22 switch the primary control unit 30 to the backup control unit 50 in the event that the cylinder actuator 80 fails to operate in accordance with the instruction signal under control of the primary control unit 30.

The monitoring section 241 is constituted by at least one of FPGA, ASIC, and computer.

The construction of the FCC 260 is the same as that of the FCC 60 except for the fact that the FCC 260 is designed to transmit no switching signal 60b to the ACE.

Then, the operation of the actuator control system 210 will be described hereinlater.

The operations of the interface 21, the control section 31, the DA converting section 32, the signal converting section 51, the DA converting section 52, the servo computing section 53, the relay unit 22, and the amplifying section 23 are the same as those of the first embodiment.

The monitoring section 241 is continuously operated to monitor various faults on the basis of the instruction signal 60a received through the interface 21, the feedback signal 80a supplied from the cylinder actuator 80, and the sensor signals received from various types of sensors, and transmit the monitoring signal 20c to the FCC 260 through the interface 21. Further, the monitoring section 241 is operated to switch the primary control unit 30 to the backup control unit 50 in the event that the cylinder actuator 80 fails to operate in accordance with the instruction signal under control of the primary control unit 30. This means that the monitoring section 241 is operated to control the relay unit 22 to have the relay unit 22 assume the backup mode having the servo computing section 53 output the raw control signal to the amplifying section 23 in the event that the monitoring section 241 judges the cylinder actuator 80 as being a fault cylinder actuator.

From the foregoing description, it is to be understood that the cylinder actuator 80 is operative to actuate the flight control surface 90 in accordance with the control signal 20a produced by the primary control unit 30 forming part of the ACE 20 on the basis of the instruction signal 60a under the condition that the monitoring section 241 does not judge the cylinder actuator 80 as being a fault cylinder actuator, and the cylinder actuator 80 is operative to actuate the flight control surface 90 in accordance with the control signal 20a produced by the backup control unit 50 forming part of the ACE 20 on the basis of the instruction signal 60a supplied by the FCC 260 under the condition that the monitoring section 241 judges the cylinder actuator 80 as being a fault cylinder actuator.

While it has been described in the above about the operation of the actuator unit 215, each of the operations of the actuator units other than the actuator unit 215 is almost the same as that of the actuator unit 215, and thus will not be described in detail hereinafter.

This leads to the fact that the flight control surface 90 is actuated by the cylinder actuator operated in accordance with the instruction signal 60a.

From the foregoing description, it is to be understood that the ACE 220 can automatically switch the primary control unit 30 to the backup control unit 50 in the event that the cylinder actuator 80 fails to operate in accordance with the instruction signal.

As will be seen from the forgoing description, it is to be understood that the present invention can provide an actuator control apparatus capable of controlling the operation of an actuator even in the event that a generic failure occurs.

What is claimed is:

1. An actuator control system, comprising
a plurality of actuators for driving one flight control surface of an aircraft;
a plurality of actuator control apparatuses being installed for each of said actuators, and producing a control signal used to control said each of actuators; and
a flight control computer producing an instruction signal used to control said actuator control apparatuses,
each of said actuator control apparatuses comprising:
a primary control means for producing a primary control signal in accordance with said instruction signal;
a secondary control means for producing a secondary control signal in accordance with said instruction signal, and being less in number of functions than said primary control means;
a switching means for selectively switching one of said primary control means and said secondary control means to the other; and
a slave instruction means for making said actuator not drive said flight control surface in the event that said actuator fails to operate in accordance with said instruction signal, wherein
said flight control computer controls said switching means so that said primary control signal is transmitted to said actuator as said control signal when a number of said slave instruction means having said flight control surface drive said actuator is not above a predetermined number, and controls said switching means so that said secondary control signal is transmitted to said actuator as said control signal when the number of said slave instruction means having said flight control surface drive said actuator is above said predetermined number,
each of said slave instruction means having a monitoring section to monitor faults of said actuators and to transmit a monitoring signal to said flight control computer, and a solenoid valve driver to transmit a slave instruction signal to a solenoid valve equipped on one of said actuators being in fault, and
said monitoring section monitoring the faults on the basis of said instruction signal supplied from said flight control computer, and feedback signals supplied from said actuators.

2. An actuator control system as set forth in claim 1, in which
said primary control means includes at least one of an FPGA (Field Programmable Gate Array), an ASIC (Application Specific Integrated Circuit), and a computer having stored therein a program and operative to execute said program, and
said secondary control means is merely constituted by one of or both of an analog circuit and a PLD (Programmable Logic Device).

3. An actuator control system as set forth in claim 1, in which
each of said primary control means and said slave instruction means includes at least one of an FPGA (Field Programmable Gate Array), an ASIC (Application Specific Integrated Circuit), and a computer having stored therein a program and having operative to execute said program, and
said secondary control means is merely constituted by one of or both of an analog circuit and a PLD (Programmable Logic Device).

4. An actuator control system as set forth in claim 1, which further comprises:
a feedback signal utilizing means for producing said control signal on the basis of a feedback signal supplied from said actuator, and in which
said primary control means and said secondary control means share said feedback signal utilizing means.

* * * * *